United States Patent Office 3,284,415
Patented Nov. 8, 1966

3,284,415
POLYURETHANE FROM ETHYLENE-HYDROXY-ALKYL ACRYLATE COPOLYMERS
Jack W. Horvath, Midland, Mich., assignor to The Dow Chemical Company, Midland, Mich., a corporation of Delaware
No Drawing. Filed Sept. 4, 1964, Ser. No. 394,619
12 Claims. (Cl. 260—77.5)

This invention relates to new resinous materials and their preparation. More particularly, the invention relates to new polyurethane resins prepared from a special type of polyol and to the use of the polyurethanes, particularly in the preparation of foamed or cellular materials.

It is an object of the invention to provide new resinous materials. tI is a further object to provide new and improved polyurethane resins which are particularly useful and valuable in industry. It is a further object to provide new polyurethane foams having improved resistance to water. It is a further object to provide improved polyurethane foams from certain resinous polyols. These and other objects of the invention will be apparent from the following detailed description thereof.

It has now been discovered that these and other objects may be accomplished by the compositions of the present invention comprising the reaction product of an organic polyisocyanate and a resinous polyol consisting of a polymer of ethylene selected from the group consisting of copolymers of ethylene and β-hydroxyalkyl acrylates having the general formula

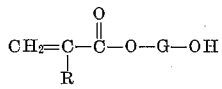

wherein R is a hydrogen atom or a methyl group and G is an alkylene group containing 2 to 8 carbon atoms, and terpolymers of ethylene, said β-hydroxyalkyl acrylate and alkyl acrylates having the general formula

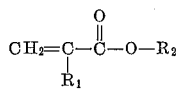

wherein $R_1$ is a hydrogen or a methyl group and $R_2$ is an alkyl group having 1 to 8 carbon atoms, and mixtures thereof.

Representative examples of β-hydroxyalkyl acrylates suitable for the preparation of the ethylene polyols of the present invention include hydroxyethyl acrylate and methacrylate, hydroxypropyl acrylate and methacrylate, hydroxybutyl acrylate and methacrylate and hydroxyhexyl acrylate and methacrylate and hydroxyoctyl acrylate and methacrylate.

Representative examples of suitable alkyl acrylates which are useful for the preparation of terpolymer polyols of the present invention include methyl acrylate and methacrylate, ethyl acrylate and methacrylate, propyl acrylate and methacrylate, butyl acrylate and methacrylate, isobutyl acrylate and methacrylate, 2-ethyl hexyl acrylate and methacrylate.

It has been found that the polyurethane resins prepared from the above described ethylene polyols have many unexpected properties which enable them to be utilized for a wider field of application than the conventional polyurethane products. It has been found, for example, that the new polyurethane resins have unexpected resistance to water. The new polyurethanes prepared from the hydroxy-containing derivatives of the resinous copolymers also having surprisingly good flexibility and resistance to impact at low temperature. The new polyurethanes have been found to be particularly useful in preparing foams for structural applications.

The ethylene/β-hydroxyalkyl acrylate copolymers, and ethylene/β-hydroxyalkyl acrylate/alkyl acrylate terpolymer used to prepare the novel polyurethane compositions of the present invention are prepared by polymerization of mixtures of ethylene and a β-hydroxyalkyl acrylate, and the alkyl acrylate if the terpolymer is desired, either in tubular or stirred autoclave reactors at pressures from about 15,000 to about 35,000 pounds per square inch or higher, at temperatures from about 100° C. to about 300° C., preferably from about 150° C. to about 260° C. using, at catalytically effective concentration, polymerization catalysts such as peroxygen-type catalysts or other free-radical producing materials such as the azo catalysts or others well known in the art.

The preparation of these copolymers are more fully disclosed in co-pending application Serial No. 321,684 of George E. Waples, Jr., filed November 6, 1963.

The ethylene/β-hydroxyalkyl acrylate copolymers advantageously employed to prepare the polyurethane compositions of the present invention contain about 65 percent to about 96 percent by weight ethylene and from about 4 percent to about 35 percent by weight of the β-hydroxyalkyl acrylate. The ethylene/β-hydroxyalkyl acrylate/alkyl acrylate terpolymers advantageously employed to prepare the polyurethane compositions of the present invention contain about 61 to about 95 percent ethylene, about 4 to about 35 percent β-hydroxyalkyl acrylate and about 1 to about 35 percent of an alkyl acrylate. The average molecular weights of these copolymers range from about 800 to 6000 and in this molecular weight range the physical state of the copolymers at room temperature ranges from oily fluids to very hard waxes. Also in this molecular weight range the copolymers have a hydroxyl content of about 0.6 to about 6.0 percent and an average hydroxyl functionality ranging from about 1.75 to about 21.

In order to prepare useful foams with polyisocyanates, it is desirable that copolymers having a molecular weight of from about 500 to about 4000 and preferably from about 1500 to about 2500 and an average hydroxyl functionality of at least 2.0 and more preferably about 2.2 to about 14 be used. At molecular weights above 4000 the copolymer is too viscous to be used as a foaming material for most applications without the use of special apparatus and at a hydroxyl functionality of less than 2.0, the foams produced have little strength.

Representative examples of organic polyisocyanates that can be used to make the polyurethane resins of the present invention include 2,4-tolylene diisocyanate, 2,6-tolylene diisocyanate, the phenylene diisocyanates, the naphthalene diisocyanates, 1,2,4-benzene triisocyanate, hexamethylene diisocyanate, trimethylene diisocyanate, methylene diisocyanate, 1,4-cyclohexylene diisocyanate, 1,3-cyclopentylene diisocyanate, and mixtures thereof. Arylene diisocyanates, that is, those in which each of the two isocyanate groups is attached directly to an aromatic ring, are preferred.

The reaction between the organic polyisocyanate and the ethylene/β-hydroxyalkyl acrylate copolymer or the ethylene/β-hydroxyalkyl acrylate/alkyl acrylate terpolymer may be carried out in a variety of ways. The reaction may be accomplished by merely mixing the reactants together at room temperature. Preferably the ethylene copolymer or terpolymer is preheated to a temperature in the range of 80° to 100° C. and the polyisocyanate heated to a temperature of about 30° to 50° C. is added to the hot ethylene polymer.

The proportions in which the reactants may be combined can be varied widely, depending chiefly on the intended application. For the preparation of foams it is generally preferred to combine the organic polyisocyanate and the ethylene polyol in chemical equivalent ratios varying from about 0.95:1.0 to about 1.05:1.0.

Polyurethane resins are made in cellular form from the organic polyisocyanate and ethylene β-hydroxyalkyl acrylate copolymer or ethylene/β-hydroxyalkyl acrylate/ alkyl acrylates terpolymer by adding water or a carboxyl group-containing compound to the reaction mixture whereby carbon dioxide is liberated which causes the liquid reaction mixture to expand and foam. Alternatively, a polyurethane foam may be made by admixing a blowing or foaming agent with one of the reactants, namely, the polyisocyanate, before they are mixed. The blowing agent and the reactants can all be brought together simultaneously or the blowing agent can be mixed with the reactants shortly after they are brought together. Representative examples of suitable blowing agents which can be used for this purpose are trichloromonofluoromethane, hexane, methylchloroform, symmetrical tetrachlorodifluoroethane, trichlorotrifluoroethane, dichloromethane, benzene, and in general any organic solvent which will readily boil at the desired foaming temperatures yet not react with the organic polyisocyanate or ethylene polyol.

A catalyst for the reaction between the polyisocyanate and the polyol copolymer or terpolymer can be used for making the foamed urethane polymers of the present invention. Representative examples of suitable catalysts are dibutyltin dilaurate, cobalt naphthenate, stannous octoate, and tertiary amines such as triethylamine, N-methyl morpholine and N,N′-dimethyl ethanolamine.

If desired, a cell-size control agent can be added to the reaction mixture. Representative of suitable cell-size control agents are polyorgano siloxanes such as liquid polyalkyl siloxanes including polydimethyl and polydiethyl siloxanes, polydipropyl siloxanes, and liquid polyaryl siloxanes, including polydiphenyl siloxane, or mixed polyarylalkyl siloxanes such as polymethylphenyl siloxanes or liquid mixtures of one or more of such siloxanes.

The formulations of this invention can be made by batch methods employing either hand mixing or simple stirring equipment. Several types of mechanical equipment are available which can automatically meter the constituents to a mixer and dispense foams in predetermined quantities. This equipment can be run either continuously or intermittently.

The polyurethane compositions of this invention can be made into useful articles by conventional molding, casting, coating, and laminating techniques. Foams of these compositions can be cast onto a conveyor belt to produce sheets or slabs of polyurethane foams which may then be cut up into convenient sizes. The foams made from the compositions of this invention can be cast in molds to make desired shapes or the foams can be cast in place to fill voids in a final article as in the strengthening of double-walled members.

The following examples are illustrative of the present invention, but the invention is not limited thereto.

EXAMPLE 1

A polyurethane foam was prepared using the following components:

Component I

Mixture containing:
Ethylene/β-hydroxypropyl acrylate copolymer _____ grams__ 100
   Comprised of 79.2 percent by weight ethylene and 20.8 percent by weight β-hydroxypropyl acrylate having the following physical properties:
      Hydroxyl content, percent _____ 2.66
      Hydroxyl functionality _____ 2.35
      Molecular weight _____ 1500
      Physical state _____ Grease
Silicon L–520, polymeric tetraethyl orthosilicate cell size control agent manufactured by Union Carbide (L–520) _____cc__ 2
Triethylene diamine (TEDA) _____cc__ 0.25
Stannous Octoate _____cc__ 0.25
Water _____grams__ 4

Component II

Mixture of:
Polymethylene polyphenylisocyanate (PAPI), a polyisocyanate having the general formula

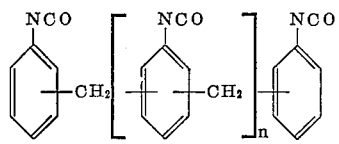

wherein $n$ is an average of approximately one, the product having an isocyanate equivalent (dibutylamine) of about 133.5 and a minimum NCO content by weight of 31 percent __grams__ 85
Ethylene dichloride (EDC) _____do____ 20

Component I heated to 90–95° C. was intimately mixed together with Component II heated to 40° C. for 5 seconds and the mixture poured into a paper container wherein the reactants expanded to a cellular mass.

The foam prepared in this manner was a brown, rigid foam, having fairly uniform cells and a density of 2.61 lbs./ft.³

EXAMPLE 2

Polyurethane foams were prepared following the procedure of Example 1 using the ethylene polyols listed in Table I below. The concentration of the reactants and the properties of the foams prepared therefrom are listed in Table II below.

TABLE I.—ETHYLENE/β-HYDROXYALKYL ACRYLATE COPOLYMER

| Sample No. | Composition of Copolymer | | | Hydroxyl content (percent) | Hydroxyl functionality | Molecular weight | Physical state |
| --- | --- | --- | --- | --- | --- | --- | --- |
| | Ethylene (percent) | β-hydroxyalkyl acrylate | | | | | |
| | | Alkyl type | Percent | | | | |
| A | 79.4 | Ethyl | 20.6 | 3.0 | 1.54 | 881 | Light Grease. |
| B | 78.0 | ___do___ | 22.0 | 3.2 | 10.6 | 5,630 | Tough Wax. |
| C | 78.6 | Propyl | 21.4 | 2.74 | 2.2 | 1,380 | Grease. |

TABLE II.—POLYURETHANE FOAMS PREPARED FROM AN ORGANIC POLYISOCYANATE AND ETHYLENE POLYMERS OF TABLE I

| Foam No. | Organic Polyisocyanate | Amount Reacted (grams) | Copolymer No. | Amount Reacted (grams) | L-520 (cc.) | Stannous Octoate (cc.) | TEDA (cc.) | H₂O (grams) | Density (lbs./ft.³) | Appearance |
|---|---|---|---|---|---|---|---|---|---|---|
| 1 | Methylene bis-(4-phenyl isocyanate) | 80 | A | 80 | 1 | 0.25 | | 3.5 | 2.16 | Brown Color, Semi-rigid. |
| 2 | Tolylene diisocyanate (80% 2, 4; 20% 2, 6) | 72 | B | 50 | 1 | 0.20 | | 3 | 1.3 | White Color, Rigid. |
| 3 | PAPI | 86 | C | 100 | 2 | 0.25 | 0.25 | ¹4 | 2.65 | Brown, Semi-rigid. |

¹ Plus 10 grams EDC.

EXAMPLE 3

A polyurethane foam was prepared following the procedure of Example 1 using the following reactants.

Component I

Ethylene/β-hydroxyethyl acrylate copolymer _____ grams__ 80
Comprised of 79.4 percent by weight ethylene and 20.6 percent by weight β-hydroxyethyl acrylate having the following physical properties:
    Hydroxyl content, percent _____ 3.0
    Hydroxyl functionality _____ 1.54
    Molecular weight _____ 881
    Physical state _____ Light grease
Silicon L-520 _____cc__ 1
Stannous octoate _____cc__ 0.25
Water _____grams__ 3.5

Component II

Methylene bis(4-phenyl isocyanate) _____grams__ 80

The foam prepared in this manner was brown, semi-rigid, not friable and had a density of 2.16 lbs./ft.³.

EXAMPLE 4

A polyurethane foam was prepared following the procedure of Example 1 using the following reactants:

Component I

Ethylene/β-hydroxyethyl acrylate/ethyl acrylate copolymer _____grams__ 100
Comprised of 70 percent by weight, 15 percent by weight β-hydroxyethyl acrylate, 15 percent ethylene acrylate having the following physical properties:
    Hydroxyl content, percent _____ 2.2
    Hydroxyl functionality _____ 3.8
    Molecular weight _____ 2900
    Physical state _____ Grease
Silicon L-520 _____cc__ 1
Stannous octoate _____cc__ 0.3
Water _____grams__ 3

Component II

Tolylene diisocyanate (80% 2,4; 20% 2,6)_grams__ 25

The foam prepared in this manner was white, firm flexible, non-friable and had a density of 4.6 lbs./ft.³.

EXAMPLE 5

The procedure of Example 4 was repeated with the exception that Component I was heated to 130° C. prior to mixing of the two components.

The foam prepared in this manner was white, flexible and had a density of 2.8 lbs./ft.³.

EXAMPLE 6

A polyurethane foam was prepared following the procedure of Example 1 using the following reactants.

Component I

Ethylene/β-hydroxyethyl acrylate copolymer comprised of 78.0 percent by weight ethylene and 22.0 percent by weight β-hydroxyethyl acrylate
_____ grams__ 50
Having the following physical properties:
    Hydroxyl content, percent _____ 3.2
    Hydroxyl functionality _____ 10.6
    Molecular weight _____ 5630
    Physical state _____ Tough wax
Silicon L-520 _____cc__ 1
Stannous octoate _____cc__ 0.2
Water _____cc__ 3.0

Twenty cubic centimeter of propylene glycol was blended in the mixture to reduce viscosity.

Component II

Tolylene diisocyanate (80% 2,4; 20% 2,6)____cc__ 60

The foam prepared in this manner was brown, semi-rigid, not friable and had a density of 1.3 lbs./ft.³.

EXAMPLE 7

Blends of an ethylene/β-hydroxypropyl acrylate copolymer designated as copolymer D comprised of 78.6 percent of weight ethylene and 21.4 percent by weight β-hydroxypropyl acrylate having the following physical properties:

Hydroxyl content, percent _____ 2.73
Hydroxyl functionality _____ 1.75
Molecular weight _____ 1090
Physical state _____ Light grease were made with the ethylene terpoylmers E and F listed in Table III below.

TABLE III.—ETHYLENE/β-HYDROXYPROPYL/ETHYL ACRYLATE COPOLYMERS

| Sample No. | Ethylene (Percent approximate values) | β-hydroxypropyl acrylate | Ethyl acrylate (Percent approximate values) | Hydroxyl content (Percent) | Hydroxyl functionality | Molecular weight | Physical state |
|---|---|---|---|---|---|---|---|
| E | 80 | 9.7 | 10 | 1.24 | 4.4 | 6,000 | Hard Plastic. |
| F | 81 | 8.6 | 9 | 1.10 | 2.3 | 3,550 | Wax. |
| G | 78 | 11.5 | 12 | 1.47 | 2.0 | 2,300 | Grease. |

Polyurethane foams were prepared following the procedure of Example 1 by reacting 100 parts of the polymer blends with 37 parts tolylene diisocyanate (80% 2,4; 20% 2,6) using the following amounts of water, blowing agent, catalyst and cell size regulator.

| Material: | Parts |
|---|---|
| Water | 3.5–4.0 |
| Ethylene dichloride | 10 |
| Stannous octoate | 0.2 |
| L–520 | 2.5 |
| Siloxane oxyalkylene block copolymer cell size regulator of the type described in U.S. 2,917,480 | 1.0 |

The composition of the blends, their properties and the physical properties of the polyurethane foams prepared therefrom are summarized in Table IV below.

TABLE IV

| Foam No. | Composition of Polymer Blend | | Amount Copolymer D (parts) | Properties of Polymer Blend | | Properties of Foam [1] | | |
|---|---|---|---|---|---|---|---|---|
| | Amount Terpolymer, Parts | | | Hydroxyl functionality | M.W. | Density (lbs./ft.³) | Tensile Strength (p.s.i.) | C.L.D.[2] at 25% |
| | E | F | | | | | | |
| 1 | 10 | 51 | 39 | 2.92 | 2,830 | 1.66 | 11.5 | 2.3 |
| 2 | 25 | 38 | 37 | 3.34 | 3,251 | 1.57 | 11.7 | 2.4 |

[1] Procedures described in ASTM D–1564–59T.
[2] Compression Load Deflection.

What is claimed is:
1. A polyurethane composition comprising the product obtained by mixing and reacting an organic polyisocyanate with a resinous polyol selected from the group consisting of
   (a) a copolymer containing from about 65 to about 96 percent by weight ethylene and from about 4 to about 35 percent by weight of a β-hydroxyalkyl acrylate having the general formula

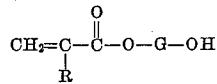

wherein R is selected from the group consisting of hydrogen and methyl and G is an alkylene group containing from 2 to 8 carbon atoms, and
   (b) a terploymer containing from about 61 to about 95 percent by weight ethylene, from about 4 to about 35 percent by weight of said β-hydroxyalkyl acrylate and from about 1 to about 35 percent by weight of an alkyl acrylate having the formula

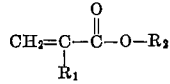

wherein $R_1$ is selected from the group consisting of hydrogen and methyl and $R_2$ is an alkyl group having from 1 to 8 carbon atoms, and mixtures of (a) and (b).
2. The polyurethane composition of claim 1 wherein the organic polyisocyanate is tolylene diisocyanate.
3. The polyurethane composition of claim 1 wherein the organic polyisocyanate is methylene bis(4-phenyl isocyanate).
4. The polyurethane composition of claim 1 wherein the β-hydroxyalkyl acrylate is β-hydroxyethyl acrylate.
5. The polyurethane composition of claim 1 wherein the β-hydroxyalkyl acrylate is β-hydroxypropyl acrylate.
6. The polyurethane composition of claim 1 wherein the alkyl acrylate is ethyl acrylate.

7. A polyurethane composition comprising the product obtained by mixing and reacting in the presence of water an organic polyisocyanate with a resinous polyol having a hydroxyl functionality of at least 1.75 and a molecular weight in the range of about 500 to about 6000 selected from the group consisting of
   (a) a copolymer containing about 65 to about 96 percent by weight ethylene and about 4 to about 35 percent by weight of a β-hyroxyalkyl acrylate having the general formula

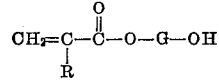

wherein R is selected from the group consisting of hydrogen and methyl and G is an alkylene group containing 2 to 8 carbon atoms, and
   (b) a terpolymer containing about 61 to about 95 percent by weight ethylene, about 4 to about 35 percent by weight of said β-hydroxyalkyl acrylate and about 1 to about 35 percent by weight of an alkyl acrylate having the formula

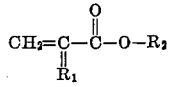

wherein $R_1$ is selected from the group consisting of a hydrogen and methyl and $R_2$ is an alkyl group having 1 to 8 carbon atoms, and mixtures of (a) and (b).
8. The polyurethane composition of claim 7 wherein the organic polyisocyanate is tolylene diisocyanate.
9. The polyurethane composition of claim 7 wherein the organic polyisocyanate is methylene bis(4-phenyl isocyanate).
10. The polyurethane composition of claim 7 wherein the β-hydroxyalkyl acrylate is β-hydroxyethyl acrylate.
11. The polyurethane composition of claim 7 wherein the β-hydroxyalkyl acrylate is β-hydroxypropyl acrylate.
12. The polyurethane composition of claim 7 wherein the alkyl acrylate is ethyl acrylate.

References Cited by the Examiner

UNITED STATES PATENTS 3,028,367   4/1962   O'Brien _____ 260—77.5

FOREIGN PATENTS 233,884   5/1961   Australia.
831,056   4/1957   Great Britain.

MURRAY TILLMAN, *Primary Examiner.*

SAMUEL H. BLECH, *Examiner.*

J. WHITE, *Assistant Examiner.*